Figure 1:
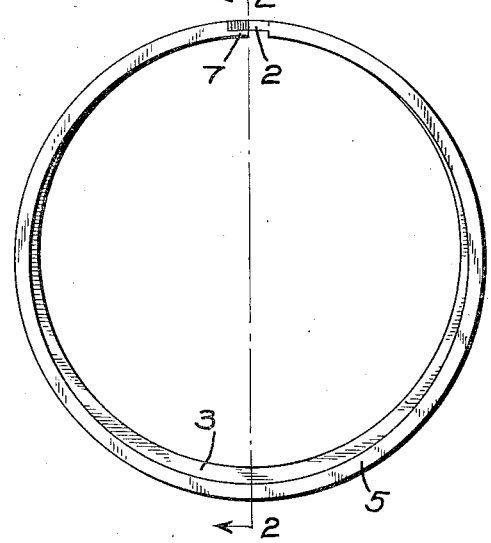

Aug. 30, 1927.

C. C. FARMER

PISTON PACKING RING

Filed Sept. 30, 1926

1,641,072

INVENTOR
CLYDE C. FARMER
BY Wm. M. Cady
ATTORNEY

Patented Aug. 30, 1927.

1,641,072

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PISTON PACKING RING.

Application filed September 30, 1926. Serial No. 138,616.

This invention relates to packing, and more particularly to a piston packing ring.

It is common practice to make piston packing rings with the inner periphery eccentric to the outer periphery so that the ring is thickest at the point opposite the split joint of the ring and gradually reduces in thickness to the joint, where the ring is the thinnest, the purpose being to ensure substantially uniform outward pressure of the ring against the cylinder wall throughout the circumference of the ring and thereby substantially uniform wear of the ring.

A piston ring should be fitted very accurately in the piston ring groove of the piston, in order to minimize leakage, but any increase in the width of the bearing faces of the ring engaging the side walls of the groove tends to increase the frictional resistance to lateral movement of the ring and thereby increases the liability of the ring sticking, thus tending to cause the ring to bear so unevenly against the cylinder wall, so as to permit leakage at some portion of the ring.

In addition, excessive depth of the side bearing of the ring increases the difficulty of assembling the ring in the piston groove and the liability to permanently distort it during assembly, while, on the other hand, a shallow side bearing increases the length of the ring subjected to deflection while slipping the ring over the piston and therefore reduces the liability to distortion.

Furthermore, it is practically impossible to cut the piston ring groove in the piston so that the sides of the groove are parallel, with the result that if the ring has groove bearing faces which are wider at one point than at another, and if the ring is ground so as to apparently fit into the groove, the groove may then be wide enough where the ring has the shallower bearing faces, so that leakage will occur.

It is therefore highly desirable to provide bearing faces on the ring of uniform width, so that the frictional resistance to lateral movement in the groove will be uniform throughout the circumference of the ring, and for this purpose, eccentric rings of the above character have heretofore been made with the thickened portion of the ring slightly tapered inwardly, so as to leave a groove bearing face at each side of the ring of uniform width. It is difficult to so accurately machine this taper as to ensure uniform bearing faces, and to do so is considered commercially impracticable. In addition, in order to ensure an accurate fit in the groove, the rings are lapped to a fit and this lapping further tends to cause variation in the width of the groove bearing faces.

The taper further forms a wedge shaped pocket, in which dirt and dust may collect and then readily work its way between the bearing faces of the ring and the side walls of the piston groove in which the ring is mounted and thus cause scoring of the ring and consequent leakage.

There is also a certain desirable type of piston ring joint, in which leakage past the joint at one portion is prevented only by a narrow face which is so positioned at the inner edge of the ring, that when the taper is machined on the ring, if not extremely accurate, will oftentimes be such that the taper will extend past the narrow face above referred to and thus permit leakage.

The principal object of my invention is to provide a piston ring of the above character, in which uniform bearing faces on the ring are assured.

Figure 2:
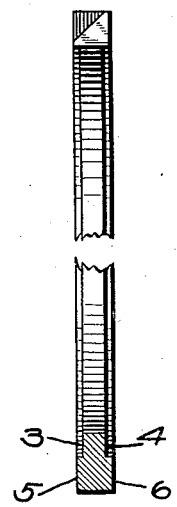

In the accompanying drawing; Fig. 1 is a face view of a piston packing ring constructed in accordance with my invention; and Fig. 2 a section on the line 2—2 of Fig. 1.

The packing ring 1, as shown in the drawing, is made thickest at the point opposite the ring joint, the thickness of the ring gradually diminishing, so that the ring is eccentric or crescent shaped. The joint may be effected by providing one free end of the ring with a tongue 2 having a beveled face adapted to engage a corresponding beveled face provided at the other free end of the ring.

According to my invention, instead of beveling off that part of the ring which is thickened, the ring is counterbored on its opposite sides at 3 and 4, so that the bearing faces 5 and 6 of the ring are of uniform width, as indicated in Fig. 1. With the faces of the ring counterbored, it will be evident that the faces of the ring may be lapped as desired, in order to fit the ring in the piston groove, without disturbing or changing the uniformity of the bearing faces.

It is also to be noted that with the type of split joint shown, where there is a narrow bearing face 7 at one side of the ring, said bearing face will always be maintained with the ring counterbored in accordance with my invention, whereas with the ring tapered, the taper is liable to extend to the portion 7 and thus destroy the leaktightness of the joint at that point.

Having now described my invention, what I claim as new and desire to secure by Letters Patent, is:

1. A split piston packing ring of gradually increasing width from the joint to the point opposite the joint, the ring being counterbored at its opposite sides to leave bearing faces of uniform width throughout the circumference of the ring.

2. A split piston packing ring of gradually increasing width from the joint to the point opposite the joint, the ring being counterbored at its opposite sides to leave bearing faces of uniform width throughout the circumference of the ring, the counterbored faces being parallel with said bearing faces.

3. A split piston packing ring having the inner periphery eccentric to the outer periphery and having the eccentricity at the opposite faces counterbored, leaving bearing faces having concentric peripheries.

4. A split piston packing ring having its inner periphery eccentric to its outer periphery and having its groove bearing faces counterbored so that the shoulder of the counterbore is concentric with the outer periphery of the ring.

In testimony whereof I have hereunto set my hand.

CLYDE C. FARMER.